United States Patent
McDavid et al.

(10) Patent No.: US 12,553,396 B2
(45) Date of Patent: Feb. 17, 2026

(54) ENGINE OPERATING STRATEGY USING PULSED INJECTION OF GASEOUS HYDROGEN FUEL

(71) Applicant: Caterpillar Inc., Peoria, IL (US)

(72) Inventors: Robert Michael McDavid, Dunlap, IL (US); Chad Palmer Koci, Washington, IL (US); Jonathan W. Anders, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/784,290

(22) Filed: Jul. 25, 2024

(65) Prior Publication Data
US 2026/0028942 A1    Jan. 29, 2026

(51) Int. Cl.
| F02D 19/02 | (2006.01) |
| F02D 41/20 | (2006.01) |
| F02D 41/40 | (2006.01) |
| F02D 41/38 | (2006.01) |

(52) U.S. Cl.
CPC ........... *F02D 19/024* (2013.01); *F02D 41/20* (2013.01); *F02D 41/401* (2013.01); *F02D 2041/389* (2013.01)

(58) Field of Classification Search
CPC ...... F02D 19/024; F02D 41/20; F02D 41/401; F02D 2041/389
See application file for complete search history.

(56) References Cited

U.S. PATENT DOCUMENTS

| 4,186,708 A | * | 2/1980 | Bowler | F02M 51/08 |
| | | | | 123/445 |
| 5,477,830 A | * | 12/1995 | Beck | F02M 35/10216 |
| | | | | 123/527 |
| 5,924,478 A | * | 7/1999 | Crocker | F28G 9/00 |
| | | | | 165/95 |
| 5,941,216 A | * | 8/1999 | Arakawa | F02M 51/061 |
| | | | | 123/490 |
| 6,640,773 B2 | * | 11/2003 | Ancimer | F02D 41/403 |
| | | | | 123/299 |
| 7,204,228 B2 | * | 4/2007 | Oechsle | F02D 41/402 |
| | | | | 123/295 |
| 7,370,628 B2 | * | 5/2008 | Eves | F02D 41/3029 |
| | | | | 123/305 |
| 7,608,011 B2 | | 10/2009 | Grabowski et al. | |

(Continued)

FOREIGN PATENT DOCUMENTS

| CH | 595554 A5 | 2/1978 |
| CN | 110552805 A | 12/2019 |

(Continued)

*Primary Examiner* — Carl C Staubach
(74) *Attorney, Agent, or Firm* — Brannon Sowers & Cracraft PC

(57) ABSTRACT

Operating an engine includes energizing an electrical actuator for a valve in a fuel injector according to a waveform alternating a plurality of on-times with a plurality of dwell times, and outputting a pulsed injection of a gaseous hydrogen fuel from the fuel injector entraining air between pulses of the gaseous hydrogen fuel. Entrainment breaks are produced between the plurality of pulses in a spray cone of the pulsed injection. The gaseous hydrogen fuel and air experience enhanced in-cylinder mixing based upon the air entrainment. Related apparatus is also disclosed.

20 Claims, 2 Drawing Sheets

(56) References Cited

U.S. PATENT DOCUMENTS

| | | | |
|---|---|---|---|
| 7,614,383 B2* | 11/2009 | Werner | F02D 41/403 |
| | | | 123/305 |
| 9,416,742 B2* | 8/2016 | Gibson | F02D 41/402 |
| 9,810,179 B2 | 11/2017 | Jaegle et al. | |
| 11,078,826 B1* | 8/2021 | Chang | F02M 21/0275 |
| 11,959,414 B2 | 4/2024 | Shroeder et al. | |
| 2003/0116660 A1* | 6/2003 | Angelino | F02M 57/02 |
| | | | 239/596 |
| 2009/0012698 A1* | 1/2009 | Shinagawa | F02B 23/0672 |
| | | | 123/575 |
| 2010/0180838 A1* | 7/2010 | Lewis, III | F02M 21/0227 |
| | | | 123/3 |
| 2010/0300407 A1* | 12/2010 | Ravenhill | F02M 35/10144 |
| | | | 123/468 |
| 2012/0160221 A1* | 6/2012 | Munshi | F02M 21/0206 |
| | | | 123/575 |
| 2015/0083085 A1* | 3/2015 | Ravenhill | F02M 19/03 |
| | | | 123/48 R |
| 2024/0410311 A1* | 12/2024 | Wilson | F02D 19/02 |

FOREIGN PATENT DOCUMENTS

| | | |
|---|---|---|
| CN | 114017178 B | 11/2022 |
| CN | 116220889 A | 6/2023 |
| DE | 102020203194 A1 | 9/2021 |

* cited by examiner

ENGINE OPERATING STRATEGY USING PULSED INJECTION OF GASEOUS HYDROGEN FUEL

FEDERALLY SPONSORED RESEARCH OR DEVELOPMENT

This invention was made with government support under DE-EE0010606 awarded by United States Department of Energy. The government has certain rights in the invention.

TECHNICAL FIELD

The present disclosure relates generally to operating an engine on a gaseous hydrogen fuel, and more particularly to outputting a pulsed injection of gaseous hydrogen fuel entraining air between a plurality of pulses.

BACKGROUND

Internal combustion engines are well-known and widely used throughout the world for many purposes including operation of drivelines in vehicles, as well as powering of pumps, compressors, and electrical generators to name a few examples. Research and development efforts are increasingly being directed toward the development of engine platforms operated on so-called alternative fuels considered to produce fewer undesired emissions as compared to traditional fuels such as diesel, gasoline, and natural gas.

One alternative fuel type receiving significant commercial and technical interest is gaseous hydrogen fuel, as well as various fuel blends containing gaseous molecular hydrogen. Hydrogen is relatively easy to ignite and has a very rapid flame speed as compared to many hydrocarbon fuels. Since engines are traditionally designed to operate on a single fuel or relatively narrow range of fuel types, adapting engine systems to hydrogen or hydrogen blends has created a host of new challenges ranging from combustion phasing and control to fuel handling and storage to lubrication and thermal management. With regard to ignitability, it has been observed that relatively thorough mixing of hydrogen fuel with air can provide benefits respecting predictability of ignition and avoidance of undesired forms and/or manner of combustion. While such insights alone represent some progress, various obstacles to exploiting gaseous hydrogen to its full theoretical potential nevertheless remain and will likely be with us for some time. One known engine arrangement including a piston apparently optimized for hydrogen fuels is known from U.S. Pat. No. 11,959,414B1 to Shroeder et al.

SUMMARY

In one aspect, a method of operating an engine includes moving a piston between a bottom-dead-center position and a top-dead-center position in a cylinder in an engine, and energizing an electrical actuator for a valve in a fuel injector according to a waveform alternating a plurality of on-times with a plurality of dwell times. The method further includes outputting a pulsed injection of a gaseous hydrogen fuel from the fuel injector entraining air between a plurality of pulses of the gaseous hydrogen fuel, based on the energizing the electrical actuator, and combusting the gaseous hydrogen fuel and air in a cylinder.

In another aspect, a gaseous fuel engine system includes an internal combustion engine having a cylinder formed therein, and a piston movable in the cylinder between a bottom-dead-center position and a top-dead-center position. The gaseous fuel engine system further includes a fuel system having a gaseous hydrogen fuel supply, a fuel injector fluid connected to the gaseous hydrogen fuel supply and having a valve electrical actuator, and a fueling control unit. The fueling control unit is structured to output electrical control commands to the valve electrical actuator, to energize the valve electrical actuator based on the electrical control commands according to a pulsed waveform, and to cause the fuel injector to output a pulsed injection of the gaseous hydrogen fuel for combustion in the cylinder based on the energizing of the valve electrical actuator In still another aspect, a method of operating an engine includes feeding a gaseous hydrogen fuel to a fuel injector coupled to an engine, and actuating the fuel injector to output a pulsed injection of the gaseous hydrogen fuel into intake air in the engine. The method further includes producing a plurality of entrainment breaks between a plurality of pulses of the gaseous hydrogen fuel in a spray cone of the pulsed injection, entraining air into the spray cone in the plurality of entrainment breaks, and combusting the gaseous hydrogen fuel and air in the cylinder.

DETAILED DESCRIPTION

Figure 1:
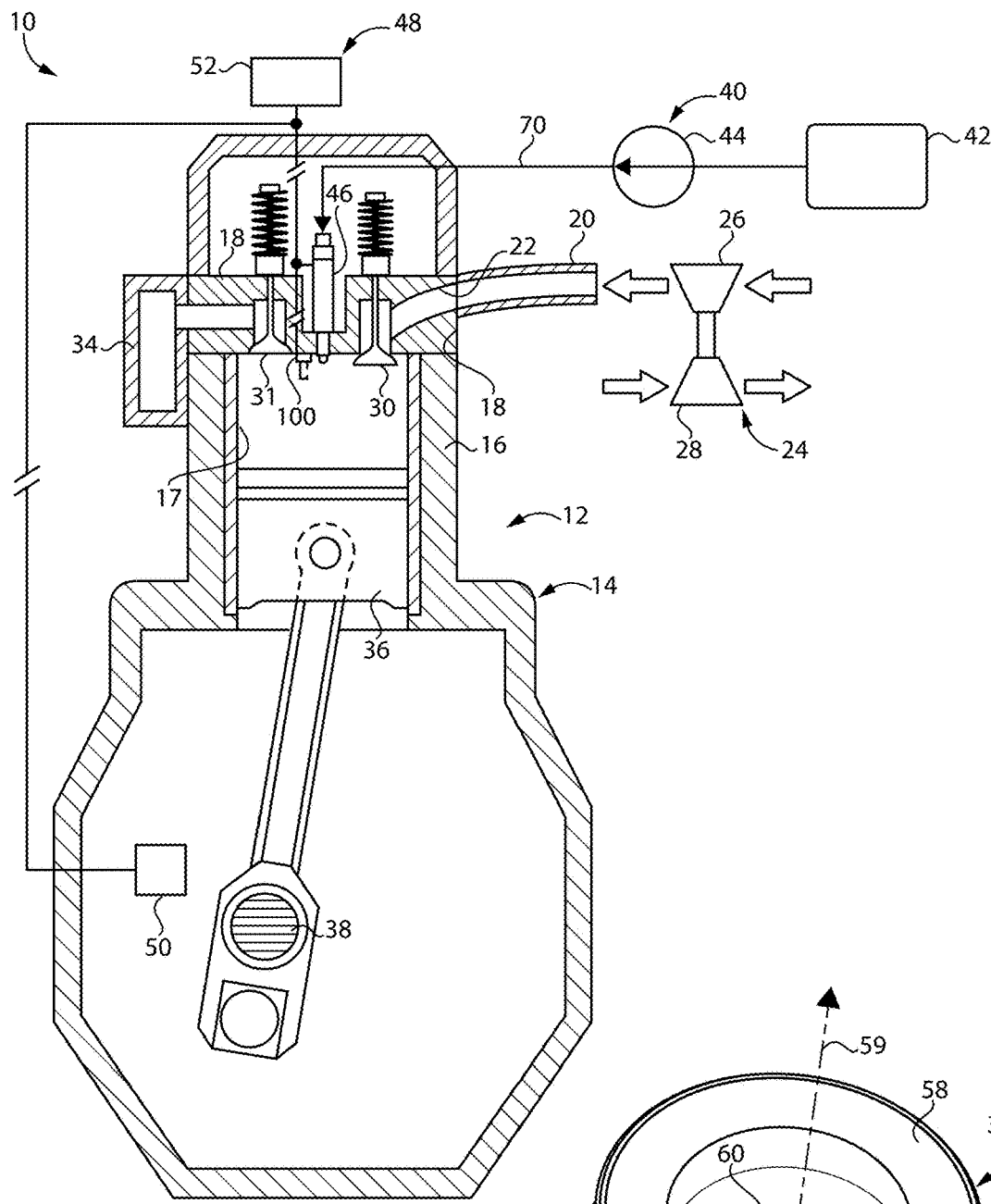
FIG. 1 is a diagrammatic view of an internal combustion engine system, according to one embodiment.

Referring to FIG. 1, there is shown an internal combustion engine system 10, according to one embodiment. Engine system 10 includes an internal combustion engine 12 having an engine housing 14 having a cylinder block 16 and a cylinder head 18. A cylinder 17 is formed in cylinder block 16 and will be understood as one of typically a plurality of cylinders in engine 12. An intake runner 20 extends to an intake port 22 formed in cylinder head 18 and feeds pressurized air from a compressor 26 in a turbocharger 24. Turbocharger 24 includes a turbine 28 conventionally operated by way of a flow of exhaust expelled from cylinder 17. An intake valve 30 is shown controlling fluid communication between intake port 22 and cylinder 17. An exhaust valve 32 controls fluid communication between cylinders 17 and an exhaust manifold 34. A piston 36 is positioned in cylinder 17 and movable between a bottom-dead-center position (BDC) and a top-dead-center position (TDC) in cylinder 17. Piston 36 is coupled to a crankshaft 38 rotatable based upon moving of piston 36 to operate a load. It should be appreciated that cylinder 17 may be one of any numbers of cylinders in any suitable arrangement such as an inline pattern, a V-pattern, or still another. Crankshaft 38 can be rotatable to power any load including an electrical generator, a driveline in a land vehicle or a marine vessel, a pump, or a compressor to name a few examples.

Engine system 10 also includes a fuel system 40. Fuel system 40 includes a fuel supply 42, a fuel pump 44, and a fuel injector 46 fluidly connected to fuel pump 44 and fuel supply 42. Fuel supply 42 may contain a gaseous hydrogen fuel, such as gaseous molecular hydrogen. Gaseous molecular hydrogen might be stored in a pressurized state, conveyed via a pipeline, or produced on-demand from a reformer, for example. In some embodiments, fuel supply 42 could contain a fuel blend such as a blend of gaseous molecular hydrogen and a hydrocarbon fuel such as methane or natural gas. Fuel blends could be produced on the fly, such as by way of blending stored gaseous molecular hydrogen and hydrocarbon fuel from a pipeline or other fuel supply. A gaseous hydrogen fuel as contemplated herein includes a fuel containing gaseous molecular hydrogen, and commonly where gaseous molecular hydrogen at least predominates by volume. In some applications, the gaseous hydrogen fuel may include substantially pure gaseous molecular hydrogen.

Engine 12 also includes a sparkplug 100 forming a spark gap in cylinder 17. Any suitable ignition strategy including spark-ignition, prechamber ignition, or potentially even liquid pilot fuel compression-ignition is within the scope of the present disclosure. In the illustrated embodiment, fuel injector 46 includes a direct injector extending into cylinder 17. Other embodiments could include a port fuel injector or intake runner fuel injector extending into one of an intake port or an intake runner to inject fuel into a feed of pressurized intake air to cylinder 17.

Fuel system 40 also includes a fuel control system 48. Fuel control system 48, discussed further herein, includes an engine timing sensor 50 and an electronic control unit 52. Electronic control unit or ECU 52 is in control communication with fuel injector 46 and with sparkplug 100, and receives sensor data from engine timing sensor 50 indicative of an engine timing, such as a crank angle timing.

Figure 2:
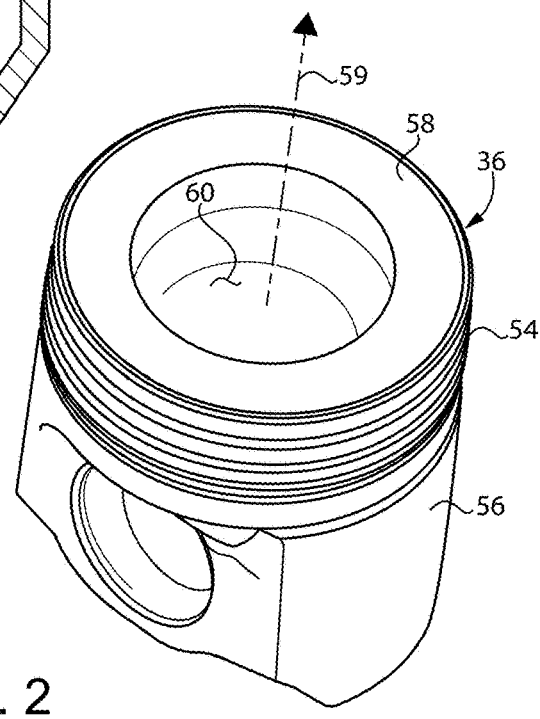
FIG. 2 is a perspective view of a piston suitable for use in the engine system of FIG. 1, according to one embodiment.
Figure 3:
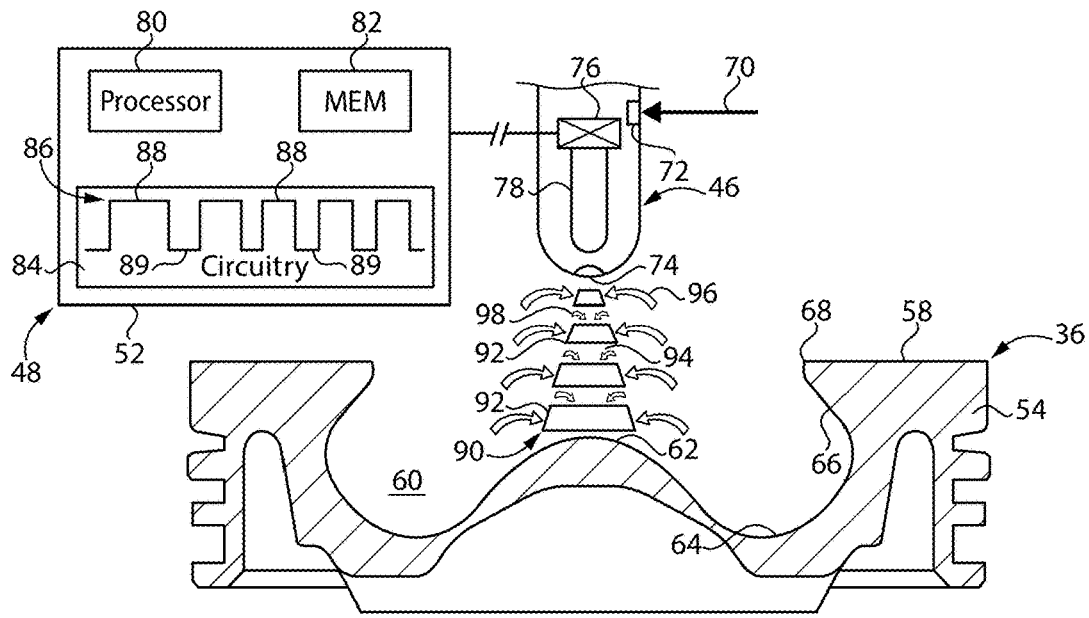
FIG. 3 is a diagrammatic view of portions of the engine system as in FIG. 1.

Referring also to FIG. 2, there are shown additional features of piston 36. Piston 36 includes a piston crown 54 attached to a piston skirt 56. A piston rim 58 extends circumferentially around a piston center axis 59. Piston crown 54 includes a combustion bowl 60 formed therein. Referring also now to FIG. 3, additional features of piston 36 include a center cone 62 extending outwardly to a bowl floor 64, and a reentrant bowl wall 66 extending upwardly and inwardly to a bowl edge 68 extending circumferentially around combustion bowl 60. Also shown in FIG. 3 is a fuel supply conduit 70 that extends from fuel pump 44 to a fuel inlet 72 of fuel injector 46. In an embodiment, fuel pump 44, potentially a plurality of fuel pumps, supplies a feed of gaseous hydrogen fuel to fuel inlet 72 at an injection pressure.

Fuel injector 46 also includes an injection valve 78 therein coupled to a valve electrical actuator 76. Injection valve 78 may include an outlet check valve that is electrically actuated to open one or more fuel outlet holes 74 to output a pulsed injection of a gaseous hydrogen fuel from fuel injector 36 into cylinder 17 and into combustion bowl 60. The one or more fuel outlet holes 74 can include a total of one hole, a total of two holes, or a total of three holes in some embodiments. Electrical actuator 76 can include a solenoid electrical actuator, or a piezoelectric actuator in some embodiments. The illustrated example depicts valve 78 as inwardly opening. Other embodiments contemplate an outwardly opening valve.

A pulsed injection of gaseous hydrogen fuel is also depicted in FIG. 3 including a spray cone 90. The pulsed injection can include a plurality of pulses 92 of gaseous hydrogen fuel in spray cone 90, and a plurality of entrainment breaks 94. Entrainment breaks 94 can be understood as gaps in spray cone 90 between pulses 92, and permit and encourage the entrainment of air into the pulsed injection. Arrows 96 and arrows 98 depict an example flow of air entrained in the pulsed injection. A total number of pulses of the gaseous hydrogen fuel may include a number of pulses greater than two. In a refinement, the number of pulses is from 3 to 8. As noted above, the pulsed injection can be outputted into a feed of pressurized intake air conveyed into cylinder 17. In the illustrated embodiment of FIGS. 1 and 3 fuel injector 46 is a direct injector outputting the pulsed injection into the feed of pressurized intake air in cylinder 17.

Figures 4, 5:
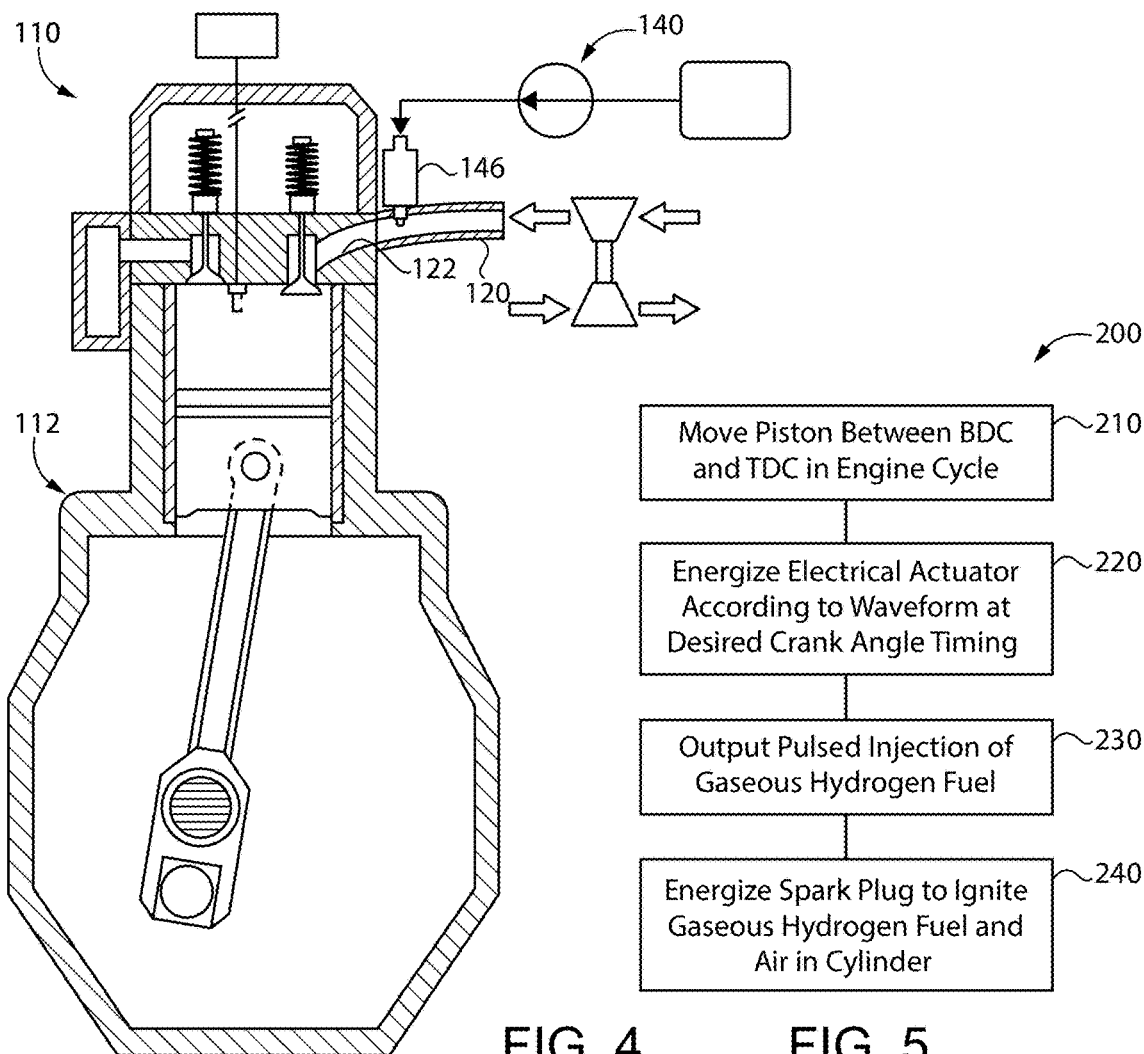
FIG. 4 is a diagrammatic view of an internal combustion engine system, according to another embodiment.
FIG. 5 is a flowchart illustrating example methodology and logic flow, according to one embodiment.

Referring to FIG. 4, there is shown an engine system 110 generally constructed analogously to engine system 10 and including an engine 112, an intake port 122, an intake runner 120, and a fuel system 140. In the FIG. 4 embodiment, fuel system 140 includes a fuel injector 146 that is positioned to inject gaseous hydrogen fuel into intake port 122 or into intake runner 120 just upstream of intake port 122. It should be appreciated that combinations of these strategies including potentially a fuel injector in an intake port or an intake runner and also a direct fuel injector, or even a fuel injector in an intake manifold may within the scope of the present disclosure. Still other embodiments may employ a feed of air and a gaseous fuel such as natural gas that is premixed and is admitted into an intake system of an engine by way of fumigation. Still other combinations and extensions on these general configurations will be apparent to those of skill in the art.

Referring now back to FIG. 3, there are shown additional features of fuel control system 48 including features of ECU 52. ECU 52 may include a processor 80 including any suitable data processor or central processing unit, such as a microprocessor or a microcontroller, and a computer readable memory 82. Memory 82 can include any suitable volatile or non-volatile memory. ECU 52 also includes circuitry 84 for energizing electrical actuator 76 to open and close valve 78. In an embodiment, circuitry 84 can be energized to produce a waveform that causes electrical actuator 76 to rapidly energize and deenergize to produce the pulsed fuel injection. Also in the illustrated embodiment, electrical actuator 76 may be energized according to a waveform 86 alternating a plurality of on-times 88 with a plurality of dwell times 89. Waveform 86 may include a square waveform, and on-times 88 may be longer in duration than dwell times 89. On-times 88 may be of equal amplitude, shape, and duration, although the present disclosure is not thereby limited.

It will be appreciated that energizing electric actuator 76 according to this general strategy can cause valve 78 to open and close a plurality of times corresponding to on-times 88 and dwell times 89, causing fuel injector 46 to output the pulsed injection of gaseous hydrogen fuel entraining air between the plurality of pulses 92. The pulsed injection can impinge upon center cone 62, with the rapidly mixing fuel and entrained air advancing outwardly along sloped sides of center cone 62, swooping along bowl floor 64 and upward and inward along reentrant bore wall 66. The flow of gaseous hydrogen fuel and entrained air can assume a roughly toroidal swirling motion around an axis that extends circumferentially around piston center axis 59. Put differently, the fuel and air can mix by way of swirling in a roughly donut shape within combustion bowl 60. Air pushed from a squish volume between piston 36 and cylinder head 18 can assist in promoting the toroidal swirling flow. At an appropriate timing sparkplug 100 is operated to ignite the mixture of gaseous hydrogen fuel and air for combustion.

It will be recalled fuel control system 48 includes engine timing sensor 50. In an embodiment, the pulsed injection may be outputted prior to a crank angle timing, based upon input from sensor 50, corresponding to the TDC position of piston 36. In a refinement, the crank angle timing may be from 40° prior to an intake valve closing timing to 40° after an intake valve closing timing. In a still further refinement, the pulsed injection is split around the intake valve closing timing. This means that one, two, three, or four pulses might be output prior to a point in time at which intake valve 30 is closed and another one, two, three, or four pulses are output after a point in time at which intake valve 30 is closed.

INDUSTRIAL APPLICABILITY

Still referring to the drawings generally, but also now to FIG. 5, there is shown a flowchart 200 illustrating example methodology and logic flow. At a block 210 piston 36 is moved between BDC and TDC in an engine cycle. From block 210 flowchart 200 advances to a block 220 to energize electrical actuator 76 according to waveform 86 at a desired crank angle timing. Those skilled in the art will appreciate that intake valve closing could occur at a range of crank angle timings, including prior to piston 36 reaching BDC at the end of an exhaust stroke, at BDC, or after BDC wherein piston 36 begins a compression stroke. From block 220 flowchart 200 advances to a block 230 to output a pulsed injection of gaseous hydrogen fuel as described herein. From block 230 flowchart 200 advances to a block 240 to energize sparkplug 100 at a desired timing, for example at TDC, to ignite the gaseous hydrogen fuel and air in cylinder 17 and commence an expansion stroke of piston 36 causing crankshaft 38 to rotate.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of operating an engine comprising:
moving a piston between a bottom-dead-center position and a top-dead-center position in a cylinder in an engine having an engine housing;
energizing an electrical actuator for a valve in a fuel injector according to a waveform alternating a plurality of on-times with a plurality of dwell times;
outputting a pulsed injection of a gaseous hydrogen fuel from the fuel injector and, inside the engine housing, entraining air into the pulsed injection between a plurality of pulses of the gaseous hydrogen fuel, based on the energizing the electrical actuator; and
combusting the gaseous hydrogen fuel and air in the cylinder.

2. The method of claim 1 wherein the waveform includes a square waveform and the plurality of on-times are longer in duration than the plurality of dwell times.

3. The method of claim 2 wherein the plurality of pulses of the pulsed injection includes a number of pulses greater than two.

4. The method of claim 3 wherein the number of pulses is from 3 to 8.

5. The method of claim 1 wherein the outputting a pulsed injection includes outputting the pulsed injection into a feed of pressurized intake air conveyed into the cylinder.

6. The method of claim 1 wherein the outputting a pulsed injection includes outputting the pulsed injection directly into the cylinder.

7. The method of claim 6 wherein the outputting a pulsed injection includes outputting the pulsed injection prior to a crank angle timing corresponding to the top-dead-center position of the piston.

8. The method of claim 7 wherein the crank angle timing is from 40° prior to an intake valve closing timing to 40° after an intake valve closing timing.

9. The method of claim 8 wherein the pulsed injection is split around the intake valve closing timing.

10. The method of claim 1 wherein the gaseous hydrogen fuel includes gaseous molecular hydrogen, and further comprising feeding the gaseous hydrogen fuel to the fuel injector at an injection pressure.

11. A gaseous fuel engine system comprising:
an internal combustion engine having a cylinder formed therein, and a piston movable in the cylinder between a bottom-dead-center position and a top-dead-center position and including a center cone;
a fuel system including a gaseous hydrogen fuel supply, a fuel injector fluid connected to the gaseous hydrogen fuel supply and having a valve electrical actuator, and the fuel injector extending into the cylinder and including a fuel outlet arranged to produce a spray cone of injected gaseous hydrogen fuel advanced from the fuel outlet and targeting the center cone for impingement;
the fuel system further including a fueling control unit structured to:
output electrical control commands to the valve electrical actuator;
energize the valve electrical actuator based on the electrical control commands according to a pulsed waveform; and
cause the fuel injector to output a pulsed injection of the gaseous hydrogen fuel forming the spray cone for combustion in the cylinder based on the energizing of the valve electrical actuator.

12. The engine system of claim 11 wherein the pulsed waveform includes a square waveform alternating a plurality of on-times with a plurality of dwell times.

13. The engine system of claim 12 wherein the plurality of on-times are longer in duration than the plurality of dwell times.

14. The engine system of claim 13 wherein the pulsed injection includes a plurality of pulses corresponding in number to the plurality of on-times, and the number is from 3 to 8.

15. The engine system of claim 12 wherein the fuel injector includes a total number of fuel outlet holes of 3 or less.

16. The engine system of claim 14 wherein the internal combustion engine further includes an intake port extending to the cylinder, an intake runner extending to the intake port, and a fuel injector fluid connected to the gaseous hydrogen fuel supply and extending into one of the intake port or the intake runner.

17. The engine system of claim 14 wherein the fuel injector extends into the cylinder.

18. A method of operating an engine comprising:
feeding a gaseous hydrogen fuel to a fuel injector coupled to an engine;
actuating the fuel injector to output a pulsed injection of the gaseous hydrogen fuel into intake air in the engine;
producing a plurality of entrainment breaks between a plurality of pulses of the gaseous hydrogen fuel in a spray cone of the pulsed injection;
entraining air into the spray cone in the plurality of entrainment breaks; and
combusting the gaseous hydrogen fuel and air in a cylinder in the engine.

19. The method of claim 18 wherein the feeding the gaseous hydrogen fuel to the fuel injector includes feeding the gaseous hydrogen fuel at an injection pressure.

20. The method of claim 19 wherein the plurality of pulses includes from 3 to 8 pulses split around an intake valve closing timing.

\* \* \* \* \*